(12) United States Patent
Palone et al.

(10) Patent No.: US 12,388,264 B2
(45) Date of Patent: Aug. 12, 2025

(54) FLYWHEEL DOUBLY-FED SYSTEM WITH CAPABILITY TO SUPPLY A DOUBLE INERTIAL CONTRIBUTION, NATURAL AND SYNTHETIC, AND RELATED INNOVATIVE OPERATION LOGIC

(71) Applicant: Terna S.p.A., Rome (IT)

(72) Inventors: Francesco Palone, Rome (IT); Luca Buono, Rome (IT); Marco Pietrucci, Rome (IT)

(73) Assignee: Terna S.p.A., Rome (IT)

( * ) Notice: Subject to any disclaimer, the term of this patent is extended or adjusted under 35 U.S.C. 154(b) by 0 days.

(21) Appl. No.: 18/560,123

(22) PCT Filed: May 10, 2022

(86) PCT No.: PCT/IB2022/054309
§ 371 (c)(1),
(2) Date: Nov. 10, 2023

(87) PCT Pub. No.: WO2022/238879
PCT Pub. Date: Nov. 17, 2022

(65) Prior Publication Data
US 2024/0235200 A1 Jul. 11, 2024

(30) Foreign Application Priority Data
May 10, 2021 (EP) .................................... 21425021
Jun. 29, 2021 (IT) ....................... 102021000017042

(51) Int. Cl.
*H02J 3/30* (2006.01)
*H02P 9/00* (2006.01)
*H02P 103/10* (2016.01)

(52) U.S. Cl.
CPC ................ *H02J 3/30* (2013.01); *H02P 9/007* (2013.01); *H02P 2103/10* (2015.01)

(58) Field of Classification Search
CPC .............................. H02J 3/30; H02J 3/28–322
See application file for complete search history.

(56) References Cited

U.S. PATENT DOCUMENTS 4,001,666 A * 1/1977 Grenfell .................... H02J 3/30
310/74
10,491,074 B2 11/2019 Kuznetsov
(Continued)

OTHER PUBLICATIONS

Nguyen, T.-T., Yoo, H.-J., & Kim, H.-M. (2015). "A Flywheel Energy Storage System Based on a Doubly Fed Induction Machine and Battery for Microgrid Control". Jun. 1, 2015. Energies, 8(6), 5074-5089. (Year: 2015).*
(Continued)

*Primary Examiner* — Rexford N Barnie
*Assistant Examiner* — David A Shiao
(74) *Attorney, Agent, or Firm* — Erik J. Overberger; RANKIN, HILL & CLARK LLP (57) ABSTRACT

A system for supporting the stability of an electrical grid comprises an asynchronous electric machine with an accessible rotor circuit and a stator with a stator circuit connected to the grid. A flywheel is coupled to the rotor, for the machine to absorb electric energy and store it as kinetic energy, and to convert the stored kinetic energy in electric energy to be delivered to the grid A static converter is connected between the grid and the rotor circuit An electronic control measures a grid frequency and determines ROCOF values, being a derivative of the frequency In case of a change in the frequency, the machine immediately provides an uncontrolled natural inertial response. Moreover, the static converter is controlled such that the machine supplies a controlled synthetic inertial response wherein the active power absorbed/supplied is modulated according to the determined ROCOF value and the uncontrolled natural inertial response already provided.

8 Claims, 3 Drawing Sheets

(56) References Cited

U.S. PATENT DOCUMENTS

| | | |
|---|---|---|
| 2006/0132103 A1 | 6/2006 | Baratto et al. |
| 2016/0336928 A1 | 11/2016 | Kuznetsov |
| 2019/0324486 A1* | 10/2019 | Jasmin .................. G06Q 50/06 |
| 2021/0028626 A1 | 1/2021 | Rosendahl et al. |
| 2021/0075217 A1 | 3/2021 | Kuznetsov |
| 2022/0014024 A1* | 1/2022 | Kammerer ............. H02K 7/025 |

OTHER PUBLICATIONS

Alvaro Ortega, Federico Milano, "Combined Frequency and RoCoF Control of Converter-Interfaced Energy Storage Systems", Sep. 10, 2019, IFAC-PapersOnLine, vol. 52, Issue 4, 2019, pp. 240-245 (Year: 2019).*

H. Akagi and H. Sato, "Control and performance of a doubly-fed induction machine intended for a flywheel energy storage system," Jan. 31, 2002, in IEEE Transactions on Power Electronics, vol. 17, No. 1, pp. 109-116, Jan. 2002 (Year: 2002).*

R. Takahashi and J. Tamura, "Frequency Stabilization of Small Power System with Wind Farm by Using Flywheel Energy Storage System," Sep. 6, 2007, 2007 IEEE International Symposium on Diagnostics for Electric Machines, Power Electronics and Drives, Cracow, Poland, 2007, pp. 393-398 (Year: 2007).*

International search report and written opinion dated Jul. 15, 2022; Application No. PCT/IB2022/054309; 11 pages.

* cited by examiner

FLYWHEEL DOUBLY-FED SYSTEM WITH CAPABILITY TO SUPPLY A DOUBLE INERTIAL CONTRIBUTION, NATURAL AND SYNTHETIC, AND RELATED INNOVATIVE OPERATION LOGIC

TECHNICAL FIELD OF THE INVENTION

The present invention relates, in general, to a system for supporting stability of an electrical grid and, more specifically, to:
- a flywheel doubly-fed system (commonly known in the reference technical field alternatively as "Flywheel Double-Fed System") for storing/delivering electrical energy from/to an electrical grid; and
- a relative innovative operation logic whereby the flywheel doubly-fed system is able to supply a double inertial contribution, natural and synthetic, so as to increase the stability of an electrical grid.

STATE OF THE ART

As is well known, the evolution of the electrical system towards a system increasingly rich in renewable energy sources has promoted the growth of energy storage systems to cope with active power fluctuations, contributing to power balance and grid frequency stability. In this context, different types of storage systems have been developed over time, among which kinetic storage systems.

In particular, the operation principle of a kinetic storage system is essentially based on the conversion of electrical energy into kinetic energy and vice versa. Whatever the type of the kinetic storage system, the components required to carry out the above-mentioned reversible energy conversion typically include:
- an electric machine (i.e. an electric motor/generator) for converting the electrical energy into kinetic energy and vice versa;
- a flywheel coupled to the electric machine for storing kinetic energy and for delivering the stored kinetic energy; and
- a bi-directional converter which allows to control the main parameters of the electric motor (i.e., power supply frequency and voltage) in order to vary the rotation speed of the flywheel and make the kinetic storage system controllable in the energy charging and discharging steps.

An example of a kinetic storage system of the aforesaid type is described in the International Application WO 2019/185753 A1, which concerns a system directly connected to an electrical distribution or transmission grid, wherein an asynchronous, double-fed and variable-speed electrical machine is coupled to a flywheel.

In particular, the system according to WO 2019/185753 A1 is designed to support a three-phase electrical grid and to operate as an energy storage device and includes an asynchronous electric machine whose rotor interacts with a flywheel, wherein said asynchronous electric machine is fed, on the one hand, by a three-phase electrical grid and, on the other hand, by a three-phase variable-frequency electric current.

More in detail, the rotor of the asynchronous electric machine is fed by a variable-frequency three-phase electric current supplied via a frequency converter connected to the three-phase electrical grid.

In addition, the system according to WO 2019/185753 A1 is configured to implement a time-power control of energy charging/discharging, wherein the storage or release of power is adjusted in accordance with the measured grid frequency and is controlled in accordance with the rotation speed gradient.

The kinetic energy that a kinetic storage system is able to store and deliver depends on the maximum ($\omega_{max}$) and minimum ($\omega_{min}$) speeds permissible for such a system, as well as its equivalent inertia $J_{eq}$ (i.e., flywheel inertia $J_v$+rotor inertia $J_r$) according to the following mathematical expression:

$$E = \frac{1}{2} \cdot J_{eq} \cdot (\omega_{max}^2 - \omega_{min}^2).$$

Several kinetic storage systems currently on the market aim to increase kinetic energy E by driving the flywheel at high speeds, typically greater than 10,000 rpm, using permanent magnet motors. In this case, the flywheel may have a lower inertia, i.e. lower mass and dimensions according to the following expression:

$$J_v = \int r^2 dm.$$

The presence of a flywheel rotating at a high speed results in high rolling friction losses, as these are proportional to the square of the speed. In particular, at the flywheel periphery, the tangential speed can assume such values as to compromise the thermal stability of the flywheel. For these reasons, the solutions currently on the market typically provide building the entire kinetic storage system (flywheel+electric motor) within a vacuum-sealed casing.

In addition, several kinetic storage systems currently on the market provide to feed the stator circuit of the electric motor via a bidirectional converter (for example of the inverter type) to control the motor speed. The speed variation of the flywheel through motor control by the converter enables to store/deliver electrical energy from/to the electrical grid. Despite the fact that the kinetic storage system has a rotating mass and, therefore, an intrinsic inertia of its own, due to the presence of an upstream static electrical energy conversion stage (bi-directional converter), the electrical transmission grid interfaces with the kinetic storage system in the same way as an electrochemical storage system, i.e. a system without intrinsic or natural inertia. Therefore, the known solutions of the aforementioned type, in the event of a frequency change on the electrical grid, do not allow to supply a power contribution resulting from the intrinsic or natural inertia of the rotating mass, but only allow to provide a power contribution resulting from a synthetic inertia that can be obtained by means of control actions by the static converter. In addition, the kinetic storage systems of the aforesaid type, being only able to provide synthetic inertia by control actions by the static converter, have a response time linked to the delays of the transfer functions of the measurement loops of the frequency and adjustment grid. Considering, for example, a time of approximately 500 ms required to obtain a reliable estimate of the grid frequency derivative (or ROCOF, acronym for "Rate Of Change Of Frequency"), one is therefore necessarily bound to this time constant before a synthetic inertia control can be implemented with a fully inverter-based kinetic storage system.

Subject and Summary of the Invention

In light of the foregoing, the Applicant felt the need to conduct a very thorough research in order to try to develop an innovative kinetic storage system able to overcome the aforementioned technical limitations of currently known solutions, thus leading to the conception of the present invention.

Therefore, an aim of the present invention is to provide an innovative kinetic storage system that is able to overcome the technical limitations of the known-type solutions.

In addition, a further aim of the present invention is to provide an innovative system to support the stability of an electrical grid, more specifically a flywheel doubly-fed system for storing/delivering electrical energy from/to an electrical grid, which is able to supply a double inertial contribution, natural and synthetic, so as to increase the grid stability.

These and other aims are achieved by the present invention in that it relates to a system for supporting the stability of an electrical grid by storing/releasing electrical energy from/to said electrical grid, as defined in the appended claims.

In particular, the system according to the present invention comprises:
- an asynchronous electric machine that includes a rotor provided with an accessible rotor circuit and a stator provided with a stator circuit;
- a flywheel coupled to the rotor,
- a static converter; and
- electronic control means;

wherein:
- the stator circuit is connected to the electrical grid to be fed by the latter;
- the static converter is connected between the electrical grid and the rotor circuit and is controllable to supply said rotor circuit with an electrical power supply with adjustable frequency and voltage;
- the asynchronous electric machine is configured to
  - absorb electrical energy from the electrical grid by converting the absorbed electrical energy into kinetic energy and by storing said kinetic energy by means of the flywheel and
  - deliver electrical energy to the electrical grid by converting the kinetic energy stored by means of the flywheel into electrical energy and by supplying the latter to the electrical grid; and
- the electronic control means are configured to
  - receive measurement data indicative of a measured frequency of the electrical grid,
  - determine, on the basis of the measurement data received, ROCOF values indicative of a derivative of the measured frequency of the electrical grid and
  - control operation of the static converter on the basis of the determined ROCOF values.

More specifically, according to the present invention, in case of a change in the frequency of the electrical grid:
- the asynchronous electrical machine is configured to immediately provide an uncontrolled natural inertial response to said frequency variation, by absorbing active power from the electrical grid in case of a frequency increase, or by supplying active power to the electrical grid in case of a frequency reduction, and
- the electronic control means are configured to
  - determine a given ROCOF value related to said frequency variation and,
  - once said given ROCOF value has been determined, start controlling the operation of the static converter so that the asynchronous electric machine begins to supply a controlled synthetic inertial response wherein the absorbed/supplied active power is modulated as a function of the given ROCOF value determined and of the uncontrolled natural inertial response already provided.

BRIEF DESCRIPTION OF THE DRAWINGS

In order to better understand the present invention, some preferred embodiments, provided for merely exemplary and non-limiting purposes will now be illustrated with reference to the enclosed drawings (not in a scale), wherein.

DETAILED DESCRIPTION OF PREFERRED EMBODIMENTS OF THE INVENTION

The following description is provided to enable a person skilled in the art to make and use the invention. Various modifications to the embodiments set forth will be immediately clear to the persons skilled in the art and the general principles herein disclosed may be applied to other embodiments and applications without, however, departing from the protection scope of the present invention as defined in the enclosed claims.

Therefore, the present invention should not be understood as limited to the sole embodiments described and shown, but it must be given the widest scope of protection in accordance with the characteristics defined in the appended claims.

The present invention relates to a system for supporting the stability of an electrical grid by storing/releasing electrical energy from/to said electrical grid. In particular, the system according to the present invention is based on a kinetic storage architecture of the flywheel doubly-fed type and will therefore be hereinafter referred to as the FDF system (where the acronym FDF stands for "Flywheel Doubly Fed") for the sake of brevity and simplicity.

Figure 1:
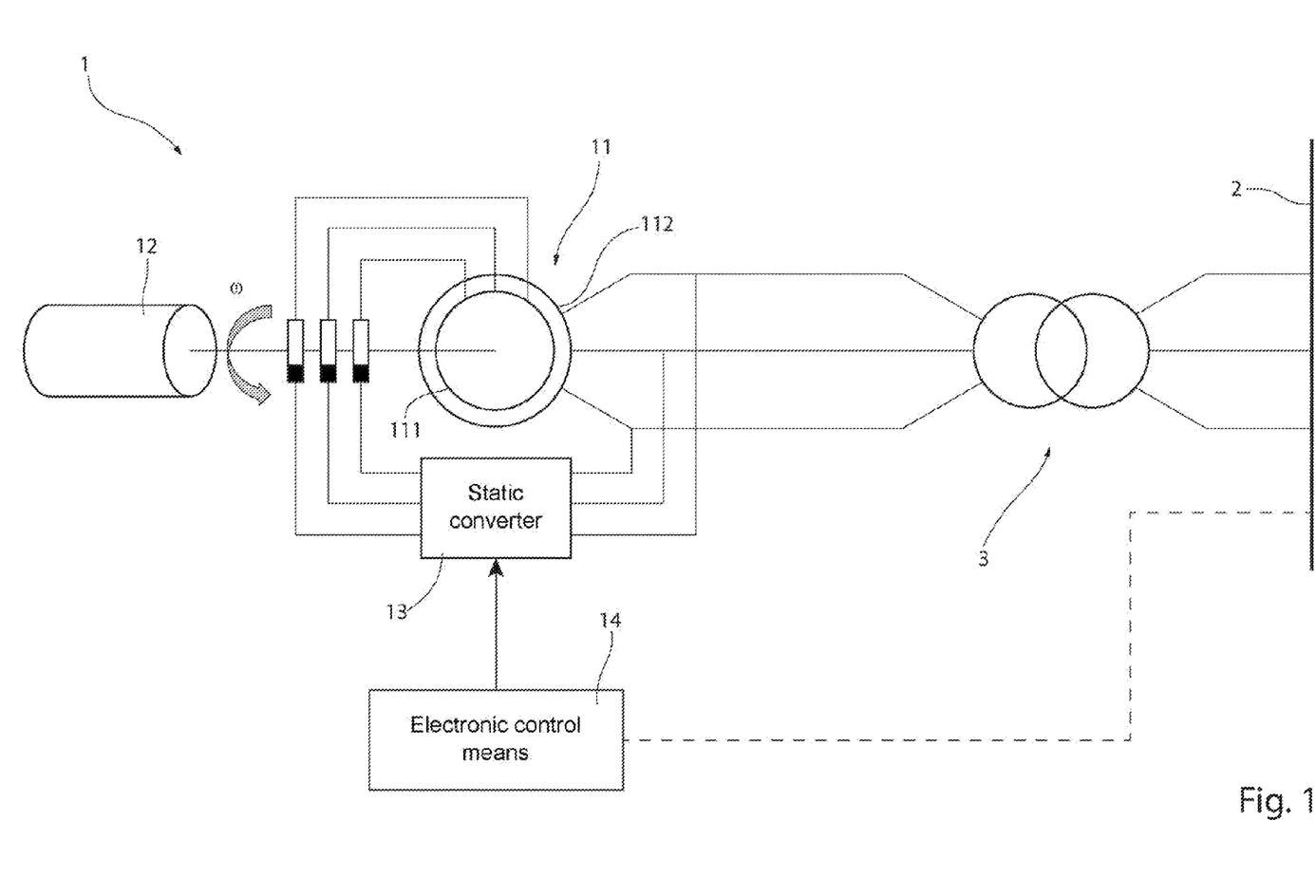
FIG. 1 schematically illustrates a flywheel doubly-fed system according to a preferred embodiment of the present invention.

FIG. 1 schematically illustrates an FDF system (denoted overall by 1) according to a preferred embodiment of the present invention.

In particular, the FDF system 1 includes:
- an asynchronous electric machine 11 (conveniently, a three-phase asynchronous motor) including a rotor 111 provided with an accessible rotor circuit (in particular, accessible compared to asynchronous squirrel-cage machines where the rotor is short-circuited) and a stator 112 provided with a stator circuit;
- a flywheel 12 coupled to the rotor 111, wherein said flywheel 12 may be either directly coupled to rotor 111 or via a mechanical device (i.e. a mechanism) for transmitting rotational speed (e.g. with a fixed or variable rotational speed transmission ratio);
- a static converter 13; and
- electronic control means 14.

The stator circuit is connected to an electrical grid 2 (conveniently, a three-phase electrical grid—e.g., an electrical transmission/distribution grid) to be fed by the latter. Conveniently, the stator circuit can be connected to the electrical grid 2 via one or more transformers 3.

The static converter 13 is connected between the electrical grid 2 and the rotor circuit and is controllable to provide said rotor circuit with an electric power supply with adjustable frequency and voltage. Conveniently, the static converter 13 may be connected to the electrical grid 2 via said transformer (s) 3.

The asynchronous electric machine 11 is configured to:
absorb electrical energy from the electrical grid 2 by converting the absorbed electrical energy into kinetic energy and by storing said kinetic energy by means of the flywheel 12; and
deliver electrical energy to the electrical grid 2 by converting the kinetic energy stored by means of the flywheel 12 into electrical energy and by supplying the latter to the electrical grid 2.

The electronic control means 14 are configured to:
receive measurement data indicative of a measured frequency of the electrical grid 2;
determine, on the basis of the measurement data received, ROCOF values indicative of a derivative of the measured frequency of the electrical grid 2; and
control the operation of the static converter 13 on the basis of the determined ROCOF values.

The present invention concerns, in particular, an innovative operation logic for the supply of a double inertial contribution, natural and synthetic, by the FDF system 1.

In fact, according to the present invention, in case a change occurs in the frequency of the electrical grid 2:
the asynchronous electric machine 11 is configured to immediately provide an uncontrolled natural inertial response to said frequency variation, by absorbing active power from the electrical grid 2 in case of a frequency increase, or by supplying active power to the electrical grid 2 in case of a frequency reduction, and
the electronic control means 14 are configured to
determine a given ROCOF value related to said frequency variation and,
once said given ROCOF value has been determined, start controlling the operation of the static converter 13 according to a predefined control logic so that the asynchronous electric machine 11 begins to supply a controlled synthetic inertial response wherein the absorbed/supplied active power is modulated as a function of the given ROCOF value determined and of the uncontrolled natural inertial response already provided.

In fact, following events that determine a change in the grid frequency, the speed $n_r$ of the rotor 111 may be considered as constant in the first moments (i.e., $n_r$=cost). Therefore, if the event determines an increase in the grid frequency (i.e. an increase in $n_s$, which indicates the synchronism speed), the FDF system 1, which is operating in the linear section of the mechanical characteristic in FIG. 2, responds in a stable manner by absorbing active power (i.e., $n_r<n_s$, s>0, where s indicates the slip). If, on the other hand, the event determines a reduction in the grid frequency (i.e. a reduction of $n_s$), the FDF system 1 responds stably by supplying active power (i.e., $n_r>n_s$, s<0). The FDF system 1 has a power response due to the natural inertia that allows for fast response times to changes in the grid frequency and inherently stable behaviour.

The presence of the static converter 13 for feeding the rotor circuit allows to vary in a controlled manner the speed $n_r$ of the rotor 111/the slip s and, therefore, the power exchanged with the electrical grid 2 as a function of the frequency error. The electronic control means 14 may be conveniently configured to generate a family of static characteristics as per FIG. 3, each of which is associated with a different synthetic inertia.

The innovative operation logic of the FDF system 1, which enables the integration of the two inertial contributions (natural and synthetic) which may be supplied by the FDF system 1, will be described in detail hereinafter.

1. Operation of the Asynchronous Electric Machine 11

Figure 2:
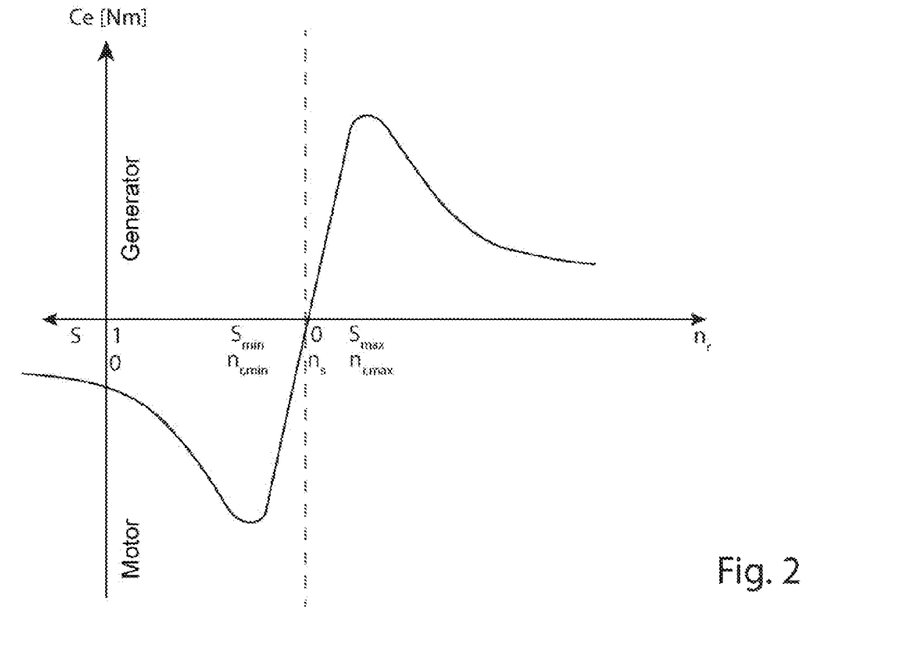
FIGS. 2-5 show example diagrams of the operation of the flywheel doubly-fed system of FIG. 1.

In FIG. 2 the static mechanical characteristic of the asynchronous electric machine 11 (i.e., electromagnetic torque as a function of the rotation speed $n_r$ of the rotor 111, for a given value of the synchronism speed $n_s$) is reported, recalling that the electrical power absorbed/supplied is proportional to the electromagnetic torque $C_e$ and the rotation speed $n_r$ of the rotor 111.

The trend of the state of charge (SOC) of the FDF system 1 is a function of the rotation speed $n_r$ of the rotor 111. In particular, when switching from $n_{r,min}$ (SOC 0%) to $n_{r,max}$ (SOC 100%), the FDF system 1 accelerates charging itself; vice versa, the FDF system 1 decelerates discharging the accumulated kinetic energy into the grid.

Conveniently, the static converter 13 used to feed the rotor circuit may be of the "Active Front End" (AFE) type so that the frequency and current on the rotor circuit can be adjusted. Such adjustment may be conveniently implemented by means of a vector control, which allows the electromagnetic torque to be controlled by acting on the current components along the direct and quadrature axis of the current. Such adjustment in fact allows a controlled variation of the electromagnetic torque at the air gap and, thus, a control of the power absorbed/supplied by the FDF system 1. In the absence of variations in the grid frequency (i.e., with constant stator frequency), the electronic control means 14, dedicated to controlling the static converter 13, can conveniently impose a variation in the electromagnetic torque at the air gap by a corresponding variation in the frequency and amplitude of the power supply voltage supplied by the static converter 13 to the rotor circuit.

Graphically, such a behaviour may be represented as a "controlled" shift of the static mechanical characteristic to the right or to the left, depending on whether a charge or discharge power set point is to be imposed.

Figure 3:
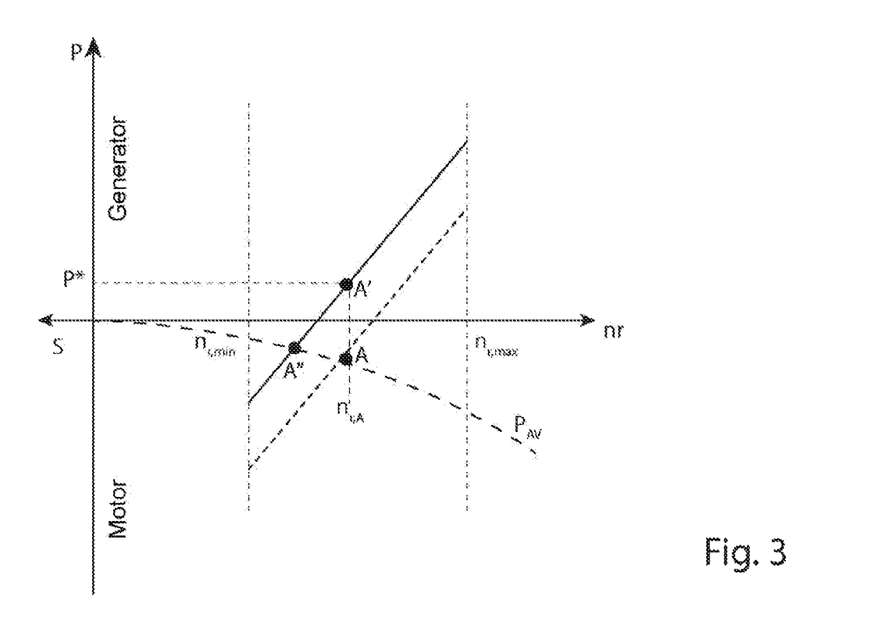

In this regard, an example graph is shown in FIG. 3, which, for simplicity's sake, only reports the stable mechanical characteristics.

Specifically, in the example of FIG. 3, it is assumed that the FDF system 1 initially operates at point A (point of balance between electromagnetic torque and friction and ventilation mechanical torque). The flywheel 12 rotates at a speed $n_{r,A}$ which will correspond to a certain value of stored kinetic energy or SOC.

Assuming that the set point P* is to be set, the electronic control means 14 can control the static converter 13 so that the latter feeds the rotor circuit with a triad of currents/voltages at different amplitudes and frequencies; the corresponding static mechanical characteristic is shifted to the left in relation to the initial static mechanical characteristic.

Since the inertia of the FDF 1 system is high, the speed $n_r$ of the rotor 111 cannot change instantaneously (i.e., constant $n_{r,A}$); the working point therefore switches from A to A', to which P* supply corresponds.

During the subsequent transient, the working point will tend to return to a balance with the load torque, decelerating to point A" and thus discharging the stored kinetic energy into the grid.

2. FDF System 1 Response to Changes in the Grid Frequency

The operation logic of the FDF system 1 hereinafter described enables said FDF system 1 to support the electrical grid 2 during frequency events (i.e. in case of changes in the grid frequency) by supplying a double power contribution, i.e. by supplying an immediate, uncontrolled natural inertial response and a delayed, controlled synthetic inertial response.

In this regard, let us consider:

$t_0$ the instant at which the frequency event occurs; and $t_m$ the time required for processing the measurement of the grid frequency derivative (i.e., "Rate Of Change Of Frequency"—ROCOF) by the electronic control means 14.

2.1 Natural Inertial Response ($t_0 < t < t_0 + t_m$)

When there is a rapid change in the grid frequency from the nominal value, i.e. a change in the synchronism speed $n_s$, there is automatically a change in the slip s, defined as:

$$s = \frac{n_s - n_r}{n_s}.$$

In the first moments, the speed $n_r$ of the rotor 111 can be considered as constant.

If the grid event determines an increase in the grid frequency (i.e., $n_r < n_s$, s>0), the FDF system 1 responds stably by absorbing active power (charge, motor behaviour).

If, on the other hand, the grid event determines a reduction in the grid frequency (i.e., $n_r > n_s$, s<0), the FDF system 1 responds stably by supplying active power (discharge, generator behaviour).

Graphically, this behaviour can be represented by considering that, in case of a change in $n_s$, the characteristic of the asynchronous electric machine 11 shifts horizontally (to the left when there is a reduction in $n_s$, to the right for an increase in $n_s$). The working point shifts to the new characteristic vertically, i.e. at constant $n_r$.

Figure 4:
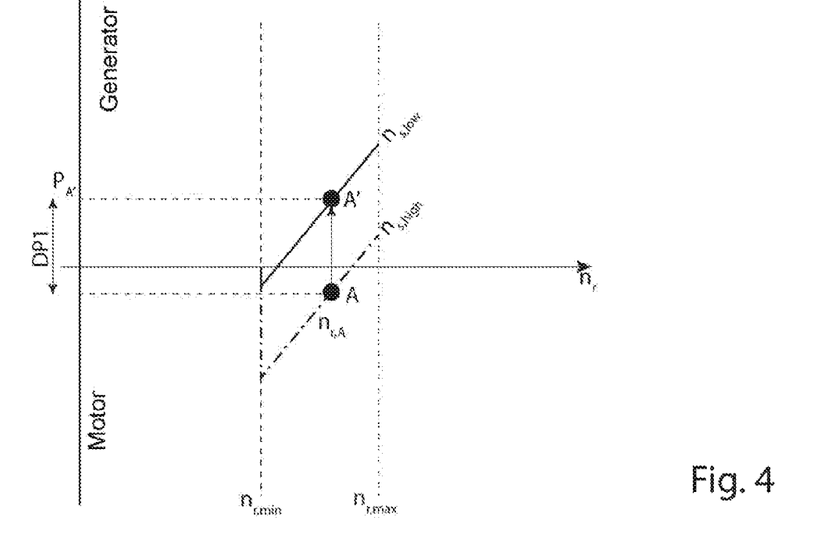

In this regard, an example graph is shown in FIG. 4 for the case wherein, following a disturbance, the grid frequency remains at $n_{s,low}$.

More specifically, in the example of FIG. 4, $n_{s,high}$ is assumed to be constant and the FDF system 1 is assumed to be working in A (dash-dot line), whereby it is kept rotating at speed $n_{r,A}$ and at constant and positive slip ($n_{r,A} < n_s$). The FDF system 1 therefore acts as a motor in that it absorbs power to keep the rotation speed. At the instant $t_0$ a reduction in the grid frequency occurs at $n_{s,low}$, so the characteristic shifts to the left (solid line). The working point therefore shifts to A', which results in $n_{s,low} < n_{r,A}$, and s<0 (generator operation). The power contribution supplied is DP1.

Such change in the power absorbed/supplied is immediate when a frequency event occurs and uncontrolled. This behaviour occurs for any value of $n_r$ (i.e. SOC) of the FDF system 1, always within the limits of maximum/minimum stored energy and maximum/minimum power of the asynchronous electric machine 11.

It can be proven that the time trend of the response will also be inertial, i.e. the DP1 provided will be proportional to:

$$DP1 \propto K \cdot ROCOF(t_0) \cdot \Delta t \text{ if } t_0 < t < t_0 + t_m,$$

where

K indicates the slope of the stable section of the asynchronous electric machine characteristic 11 (i.e., a nameplate figure, which can be calculated as the ratio of the machine rated power to the rated slip), $ROCOF(t_0)$ indicates the derivative of the grid frequency at the instant $t_0$ and $\Delta t$ indicates the time range during which such response can be sustained, thus depending on the stored kinetic energy, i.e. $SOC(t_0)$, and on the DP1 itself.

In this regard, it is worth highlighting that:

the state of charge (or SOC) at the instant $t_0$ when the frequency event occurs (proportional to the square of the speed of rotation $n_r$ at that instant and to the mechanical inertia of the FDF system 1) represents the kinetic energy available for providing the inertial response, i.e. the duration during which that response may be sustained;

in case of a low $SOC(t_0)$, it may occur that the power supplied resets to zero (at $n_{r,min}$) before the processing time $t_m$ has elapsed, thus making it impossible to supply the additional contribution of the synthetic inertial response.

2.2 Synthetic Inertial Response ($t > t_0 + t_m$)

The synthetic inertia supply function can be conveniently defined by means of an appropriate control law that modulates the power absorbed/supplied by the FDF system 1 as a function of the measured value of the derivative before the grid frequency (i.e. ROCOF).

The control law may be conveniently implemented by a corresponding software and/or firmware control logic preloaded on the electronic control means 14 and executed by them when the FDF system 1 is in operation.

However, the supply of the synthetic inertial response is bound to the processing of the ROCOF measure (which will be hereinafter referred to as $\overline{ROCOF}$).

In order to calculate the $\overline{ROCOF}$ value, the electronic control means 14 are preferably configured to:

continuously sample the measured grid frequency;

filter the sampled grid frequency; and process the data thus obtained to calculate the $\overline{ROCOF}$ measured value.

It can be assumed, for simplicity's sake, that the aforementioned sampling, filtering and processing operations require a time equal to $t_m$.

Furthermore, unlike the natural inertial response, the synthetic power response supplied by the FDF system 1 is controllable in module (always within the power and energy limits of the FDF system 1).

In particular, the contribution of the synthetic inertial response DP2 may be described as:

$$DP2 = \alpha \cdot \overline{ROCOF} \text{ if } t > t_0 + t_m.$$

It is therefore possible to adjust the amplitude of the synthetic inertial response by acting on the parameter $\alpha$, remembering that, in any case, the value of the synthetic inertial response DP2 is limited by the size of the asynchronous electric machine 11.

In addition, it is important to note that the state of charge at the instant the synthetic inertial response DP2 is initiated—i.e., $SOC(t_0+t_m)$—represents the energy actually available for supplying said synthetic inertial response DP2, whereby the time for supplying the latter depends on both $SOC(t_0+t_m)$ and on the DP2 value set. Thus, by appropriately adjusting the parameter α, it is possible to decide to minimise or maximise the synthetic inertial contribution over the natural one.

Figure 5:
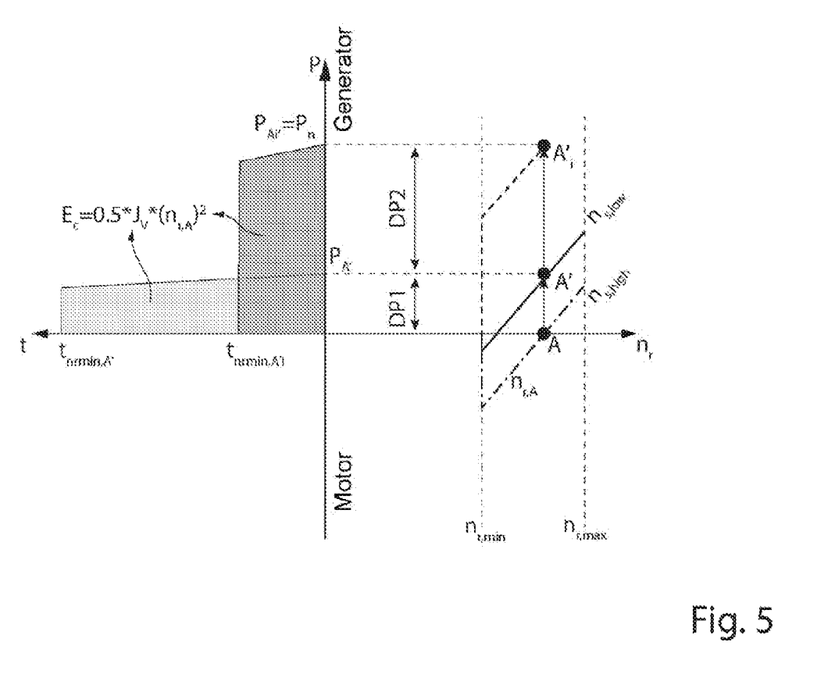

In FIG. 5 an example graph is shown related to the working point shifted following the activation of the synthetic inertial response (in quadrant I) and an exemplary trend of the power response over time (in quadrant II).

In particular, in the example of FIG. 5, following a reduction in the grid frequency from $n_{s,high}$ to $n_{s,low}$, the natural inertial response brings the working point from A to A', wherein the FDF system 1 supplies the active power $P_{A'}$. However, the FDF system 1 is not supplying the nominal power $P_n$ of the asynchronous electric machine 11, so it is possible, by implementing synthetic inertia, to shift the working point to $A'_i$ (i.e. to the characteristic with a "fictitious" dotted line, since it does not correspond to a further reduction in the grid frequency), thus bringing the FDF system 1 to supply an active power $P_{Ai}$, equal to the nominal power $P_n$.

In order to activate the supply of the synthetic inertial response, one or more adjustable minimum ROCOF thresholds $ROCOF_{min}$ may be conveniently defined so that:
- if $\overline{ROCOF} < ROCOF_{min}$, the supply of the synthetic inertial response is not activated and the FDF system 1 continues to supply the natural inertial contribution DP1 within the power/energy limits as grid conditions change;
- if, instead, $\overline{ROCOF} > ROCOF_{min}$, the supply of the synthetic inertial response is activated.

Furthermore, on the basis of
$\overline{ROCOF}$ and $\overline{\Delta f}$, i.e. the shift between measured frequency and nominal value,
$SOC(t_0+t_m)$ and
predefined objectives of the implemented control logic (e.g. maximisation or minimisation of the FDF system 1 contribution depending on grid conditions), the value of the parameter α may be conveniently set according to three options:
a) $\alpha > K \cdot \Delta t \rightarrow$ increasing the synthetic inertial power contribution DP2 (at most up to the nominal power $P_n$) compared to the natural inertial contribution DP1, while reducing the supply time of DP2;
b) $\alpha = K \cdot \Delta t \rightarrow$ limit case wherein the FDF system 1 supplies a synthetic inertial contribution DP2 equal to the natural inertial response DP1;
c) $\alpha < K \cdot \Delta t \rightarrow$ reducing the synthetic inertial power contribution DP2 compared to the natural inertial contribution DP1, while increasing the supply time of DP2.

The value of the parameter α can be conveniently varied (i.e. different predefined values of the parameter α may be conveniently used) depending on whether an overfrequency ($\overline{\Delta f} > 0$) or underfrequency ($\overline{\Delta f} < 0$) event occurs.

In particular, during an underfrequency event, in order to support the electrical grid 2 and reduce the risk of blackout, the synthetic inertial contribution of the FDF system 1 may be conveniently maximised by selecting option a); on the other hand, for overfrequency events, which are typically less frequent, option b) or c) may be conveniently selected.

Furthermore, in case $SOC(t_0+t_m)$ is close to the limit values of 100% (in the case of an overfrequency event) or 0% (in the case of an underfrequency event), option c) is preferably selected in order to exploit the contribution of the FDF system 1 for as long as possible.

Moreover, having a nearly real-time measurement or estimate of the inertia of the electrical grid 2 to which the FDF system 1 is connected, it may be conveniently selected:

option a) in case a low grid inertia value is detected (i.e. a grid inertia value equal to/less than a predefined first grid inertia threshold), in order to better support the low-inertia electrical grid 2; and option b) or c) in case of high grid inertia values (i.e. grid inertia values equal to/higher than a second predefined grid inertia threshold).

Thereby, the synthetic inertial contribution of the FDF system 1 is a function of the natural inertial response supplied and the measured ROCOF value.

From the foregoing disclosure, the many innovative characteristics and the innumerable technical advantages of the present invention are immediately evident to a person skilled in the art.

In this regard, it is extremely important to remember that currently known kinetic storage systems (either based on the use of permanent magnet motors, inverter-type converters for the power supply of the stator circuit, or asynchronous double fed electric machines such as, for example, the system disclosed in WO 2019/185753 A1) are only and exclusively capable of providing synthetic inertia and only after the time required to obtain a reliable estimate of the grid frequency derivative, i.e. the ROCOF, has elapsed.

By contrast, as explained above, the FDF system according to the present invention is able to supply a double inertial contribution, i.e. an immediate and uncontrolled natural inertial contribution and a delayed and controlled synthetic inertial contribution, thus being able to support the stability of an electrical grid in an extremely effective and efficient manner.

In addition, the specific control/adjustment logic in supplying the synthetic inertial response implemented by the FDF system according to the present invention and described in paragraph 2.2 above is also absolutely innovative compared to known solutions.

In conclusion, it is important to note that, while the above described invention refers in particular to very specific embodiments, it must not be intended as limited to such embodiments, including within its scope all the variants, modifications, simplifications or generalisations covered by the enclosed claims.

The invention claimed is:

1. A system for supporting stability of an electrical grid by storing electrical energy from said electrical grid and releasing electrical energy thereto, comprising:
   an asynchronous electric machine that includes a rotor provided with an accessible rotor circuit and a stator provided with a stator circuit;
   a flywheel coupled to the rotor;
   a static converter; and
   electronic control means;
   wherein:
   the stator circuit is connected to the electrical grid to be fed by the electrical grid;
   the static converter is connected between the electrical grid and the rotor circuit and is controllable to supply said rotor circuit with an electrical power supply with adjustable frequency and voltage;
   the asynchronous electric machine is configured to
      absorb a first electrical energy from the electrical grid, convert the first electrical energy into a first kinetic energy, and store said first kinetic energy by means of the flywheel, and
      deliver a second electrical energy to the electrical grid by converting a second kinetic energy stored by means of the flywheel into said second electrical energy, and by supplying said second electrical energy to the electrical grid; and the electronic control means are configured to
receive measurement data indicative of a measured frequency of the electrical grid,
determine, on the basis of the measurement data received, rate of change of frequency (ROCOF) values indicative of a derivative of the measured frequency of the electrical grid and
control operation of the static converter on the basis of the determined ROCOF values;

wherein, when a frequency variation occurs in the electrical grid:

the asynchronous electrical machine is configured to immediately provide an uncontrolled natural inertial response to said frequency variation, by the frequency variation being applied to the stator circuit by the electrical grid, such that the flywheel and asynchronous electrical machine absorb active power from the electrical grid in case of a frequency increase and supply active power to the electrical grid in case of a frequency reduction, and the electronic control means are configured to
determine a given ROCOF value related to said frequency variation and,
once said given ROCOF value has been determined, start controlling the operation of the static converter so that the asynchronous electric machine begins to supply a controlled synthetic inertial response wherein the active power that is respectfully absorbed and supplied is modulated as a function of the given ROCOF value determined and of at least one parameter of the uncontrolled natural inertial response already provided;
selectively set the controlled synthetic inertial response higher or lower than the uncontrolled natural inertial response while respectively reducing and increasing a supply time of said controlled synthetic inertial response, or to selectively set the controlled synthetic inertial response equal to the uncontrolled natural inertial response, based on one or more of the following parameters and conditions:
a deviation between the measured frequency of the electrical grid and a predefined nominal value of grid frequency, or an occurrence in the electrical grid of an over-frequency or under-frequency event;
a current value of energy stored in the system when the supply of the controlled synthetic inertial response begins;
one or more predefined operational objectives of the system;
one or more measured or estimated values of inertia of the electrical grid.

2. The system of claim 1, wherein the electronic control means are configured to activate the supply of the controlled synthetic inertial response only when the given ROCOF value determined satisfies one or more predefined conditions with respect to one or more predefined minimum ROCOF thresholds.

3. The system according to claim 1, wherein, when an under-frequency event occurs in the electrical grid, the electronic control means are configured to set the controlled synthetic inertial response higher than the uncontrolled natural inertial response while reducing the supply time of said controlled synthetic inertial response.

4. The system according to claim 1, wherein, when an over-frequency event occurs in the electrical grid, the electronic control means are configured to set the controlled synthetic inertial response lower than the uncontrolled natural inertial response while increasing the supply time of said controlled synthetic inertial response, or to set the controlled synthetic inertial response equal to the uncontrolled natural inertial response.

5. The system according to claim 1, wherein, when the current value of energy stored in the system when the supply of the controlled synthetic inertial response begins is equal to predefined limit values, or closer to the limit values than a predefined threshold, the electronic control means are configured to set the controlled synthetic inertial response lower than the uncontrolled natural inertial response while increasing the supply time of said controlled synthetic inertial response.

6. The system according to claim 1, wherein, when one or more measured or estimated values of inertia of the electrical grid are equal to or lower than, a first predefined grid inertia threshold, the electronic control means are configured to set the controlled synthetic inertial response higher than the uncontrolled natural inertial response while reducing the supply time of said controlled synthetic inertial response.

7. The system according to claim 1, wherein, when one or more measured or estimated values of inertia of the electrical grid are equal to, or greater than, a second predefined grid inertia threshold, the electronic control means are configured to set the controlled synthetic inertial response lower than the uncontrolled natural inertial response while increasing the supply time of said controlled synthetic inertial response, or to set the controlled synthetic inertial response equal to the uncontrolled natural inertial response.

8. A system for supporting stability of an electrical grid by storing electrical energy from said electrical grid and releasing electrical energy thereto, comprising:
an asynchronous electric machine that includes a rotor provided with an accessible rotor circuit and a stator provided with a stator circuit;
a flywheel coupled to the rotor;
a static converter; and
electronic control means;
wherein:
the stator circuit is connected to the electrical grid to be fed by the electrical grid;
the static converter is connected between the electrical grid and the rotor circuit and is controllable to supply said rotor circuit with an electrical power supply with adjustable frequency and voltage;
the asynchronous electric machine is configured to
absorb a first electrical energy from the electrical grid, convert the first electrical energy into a first kinetic energy, and store said first kinetic energy by means of the flywheel, and
deliver a second electrical energy to the electrical grid by converting a second kinetic energy stored by means of the flywheel into said second electrical energy, and by supplying said second electrical energy to the electrical grid; and
the electronic control means are configured to
receive measurement data indicative of a measured frequency of the electrical grid,
determine, on the basis of the measurement data received, rate of change of frequency (ROCOF) values indicative of a derivative of the measured frequency of the electrical grid and control operation of the static converter on the basis of the determined ROCOF values;

wherein, when a frequency variation occurs in the electrical grid:

the asynchronous electrical machine is configured to immediately provide an uncontrolled natural inertial response to said frequency variation, by the frequency variation being applied to the stator circuit by the electrical grid, such that the flywheel and asynchronous electrical machine absorb active power from the electrical grid in case of a frequency increase and supply active power to the electrical grid in case of a frequency reduction, and the electronic control means are configured to
    determine a given ROCOF value related to said frequency variation and,
        once said given ROCOF value has been determined, start controlling the operation of the static converter so that the asynchronous electric machine begins to supply a controlled synthetic inertial response wherein the active power that is respectfully absorbed and supplied is modulated as a function of the given ROCOF value determined and of at least one parameter of the uncontrolled natural inertial response already provided;

and wherein:

said at least one parameter is a first coefficient, whereby the uncontrolled natural inertial response is proportional to the product of the first coefficient and the determined ROCOF, and modulating the controlled synthetic inertial response comprises setting a second coefficient as a function of the first coefficient, whereby the controlled synthetic inertial response is the product of the second coefficient and the determined ROCOF.

* * * * *